Patented July 11, 1950

2,515,135

UNITED STATES PATENT OFFICE 2,515,135

ANIMAL NUTRITION

Milton A. Petty, Pearl River, N. Y., assignor to American Cyanamid Company, New York, N. Y., a corporation of Maine No Drawing. Application June 8, 1948, Serial No. 31,832

6 Claims. (Cl. 99—9)

This invention relates to a new vitamin, or nutritional factor, and to a process of preparing the same.

During the past 20 years or so many individual substances have been found to be essential to the normal growth and well-being of animals. Many of these have been identified and synthesized by chemical methods. The nature of others is still in doubt. Lately it has been shown that chicks require an unknown factor in their diet for normal growth. The hatchability of eggs also seems to be dependent upon what appears to be the same substance. This factor is believed to exist in fish meal, liver, cow manure and possibly a few other materials. Its non-identity with known vitamins has been demonstrated.

Recently, I have been able to produce by fermentation methods a substance which will promote the growth of baby chicks when incorporated in vegetable diets which lack the unknown growth promoting substance found in fish meal and other animal products. Whether or not the growth factor produced by my process is identical with or even related to the unknown factor of fish meal can not be proven at the present time inasmuch as the chemical and physiological nature of the new substance has not yet been definitely determined. Regardless of this, however, it has been found that the new product can be used to serve a highly useful purpose in animal nutrition. While the principal use of the new product appears at present to be as an adjunct to poultry feeds, it may also be of considerable value in the feeding of other animals and of possible use in medicine in the treatment of deficiency diseases, in both man and animal. In fact, purified extracts of the fermentation product have been shown to be effective in the treatment of pernicious anemia in humans.

The new product of the present invention is produced by an organism of the genus Flavobacterium when grown in a suitable nutrient medium. The amount of the growth factor produced by the fermentation process is small, on a weight basis, but as it is extremely active in a physiological sense, the fermentation liquor and the bacterial cells obtained from the process can be used to supply commercially adequate quantities of the vitamin. For use in animal nutrition it will be desirable in most cases to concentrate the fermentation product for convenience in shipping and to make it easy to incorporate the material in the feed. For use in chicken feed approximately 1 to 20 lbs., more or less, of the concentrated fermentation liquor, on a dry basis, may be added per ton of feed to obtain an adequate physiological response. This amount may vary considerably, however, with the potency of the fermentation liquor which may itself vary considerably, and the amount of the new nutritional substance desired to be incorporated in the diet of the animal.

To prepare the new substance of the present invention bacteria of the genus Flavobacterium are grown in suitable nutrient media. Bacteria of the species F. solare have been found to be especially suitable as they give a high yield of the nutritional factor. Strains and mutants of this bacterial species may likewise be used, in some cases to produce fermentation liquor having higher amounts of the growth factor. Other species of this genus including F. acetylicum, F. acidificum, F. aquatile, F. aroborescens, F. esteroaromaticum, F. flavescens, F. suaveolens, etc., have been used to produce the new product in small yields.

Fermentation is conducted by inoculating with Flavobacterium solare, a nutrient medium containing sources of nitrogen, carbon, hydrogen, oxygen, sulphur and other elements usually found necessary in fermentation processes. One such medium had the following composition:

| | | |
|---|---|---|
| Yeast extract (Difco) | grams | 5 |
| Peptone (Difco) | do | 5 |
| Malt extract | do | 10 |
| Dextrose | do | 10 |
| $KH_2PO_4$ | do | 1.0 |
| NaCl | do | 1.0 |
| Urea | do | 2.0 |
| $Ca(NO_3)_2$ | do | 0.5 |
| $MgSO_4.7H_2O$ | do | 0.25 |
| $FeSO_4.7H_2O$ | do | 0.05 |
| $H_2O$ | cc | 1000 |

Obviously each of these substances may be replaced in whole or in part with other substances which supply assimilable nitrogen, carbon, oxygen, sulphur, hydrogen and the necessary inorganic substituents for proper growth and metabolism of the bacteria.

The fermentation process is conducted within the temperature range of about 20° C. to 40° C., optimum results being obtained between about 28° C. and 32° C. The growth medium should have a pH between 6 and 7, but growth of the Flavobacterium and production of the new growth factor of the present invention will take place over a fairly wide range of hydrogen ion concentrations of from about pH 5 to pH 8 and even lower and higher.

Bacteria of the Flavobacterium genus are aerobic, for the most part, and should usually be supplied with air during the fermentation process. When the process is conducted in deep tanks with large volumes of liquor it will be desirable to aerate the medium by blowing air through the liquor. Aeration at the rate of from about 0.2 to 2.0, preferably between .25 and .75, volumes of air per volume of medium per minute will ordinarily be satisfactory. Of course, the fermentation may also be conducted in shallow layers in pans or in shaker flasks or by allowing the fermentation liquor to flow or trickle in thin layers while exposed to the atmosphere. In such cases positive aeration is not necessary. The fermentation vessel may be of glass or metal. Mechanical agitation may be employed to speed up the fermentation.

If necessary, foam depressants such as octadecanol in mineral oil, or lard oil, and the like may be added as required to prevent excess foaming.

To inoculate the medium standard methods of bacterial inoculation are employed. For example, an agar slant carrying a 24 hour culture of the *F. solare* may be washed with water, and the liquid used to inoculate a larger growth medium such as, for example, 100 ml. of an autoclaved solution such as previously described. The solution is contained in 500 ml. cotton stoppered Erlenmeyer flasks which are shaken mechanically at, for example, 100 cycles per minute. ½ to 1 ml. of the solution from the agar slant is used to inoculate each of the flasks. After allowing the organism to grow in the flask for one to three days at 26° C. to 34° C., the culture may be removed and used to inoculate a larger volume of a nutrient media. The fermentation may then be allowed to proceed under the conditions specified herein for one to five days until an optimum quantity of the growth factor is formed in the liquor. The liquor is then withdrawn and may be used directly or may be concentrated to any desired degree down to dryness and added to the diet of the animal.

Much of the biologically active material is contained in the bacterial cells. This material may be released therefrom by destroying the cell structure by mechanical disintegration, by heating or by other methods known to those in the art. The cell debris may then be removed, if desired, and the growth factor concentrated, purified and isolated.

A large number of different types and kinds of carbohydrates and related carbonaceous materials may be used in the nutrient medium to supply a source of carbon. To illustrate, a basal growth medium containing by weight 0.5% peptone and 0.3% beef extract and adequate quantities of the mineral elements was used in a series of experiments. To this medium was added 1% of various carbonaceous materials. The following were tested in the above basal medium and are listed in their approximate order of effectiveness: maltose (technical), galactose, sucrose, dextrose, dextrin, d-mannose, sorbitol, and soluble starch (Merck). All of these supported growth of the *Flavobacterium solare* which was introduced into the medium under aseptic conditions. Glyceride oils may also be used to supply all or part of the carbon required by the growing bacteria. In general, the medium should contain from about 5 to 50 grams of assimilable carbon per liter of the medium.

Another series of experiments was run using spent penicillin mash as a basal medium. This liquor had been treated to remove the penicillin and the organic solvents used in the extraction process. To this medium was added a carbon source ranging from about 1% to 3% by weight. A technical grade of maltose gave the best growth of the organism, as determined by turbidimetric methods. Sucrose, malt extract, and dextrose were also effective in supporting growth of the organism in the spent penicillin mash.

As a source of nitrogen there may be used a wide variety of organic and inorganic substances including meat extracts, cottonseed meal, corn meal, hydrolyzed protein material, distillers' solubles, dried yeast, fish meal, soy bean meal, enzyme digested liver residue, casein, urea, nitrates and the like. Naturally the amount of such nitrogenous material will vary considerably with the amount of nitrogen present and the availability of it. Ordinarily it is preferred that the growth medium contain from about 0.5 to 5.0 grams of assimilable nitrogen for each liter of the medium.

As in other fermentation processes numerous mineral substituents including traces of certain elements are desirable components of the medium. Many of these occur in the carbonaceous and nitrogenous substances added to make up the medium, and further addition is not necessary. However, the medium should contain from one source or another the elements calcium, magnesium, potassium, sodium, phosphorus, sulphur, iron and small amounts of the trace elements copper, zinc, aluminum, manganese and boron. Inasmuch as those skilled in the fermentation art understand these requirements, the optimum amounts thereof are readily determined upon simple experimentation, and further discussion herein appears to be unnecessary.

As previously mentioned, the bacterial cells and the liquor resulting from the fermentation process contains small amounts of the new vitamin substance. A convenient standard by which the biological potency of the new factor may be compared is the "chick unit." One chick unit of the animal protein factor of the present invention is defined as the minimum amount which must be added to 1 gm. of a basal diet containing adequate quantities of all of the known vitamins but deficient in the growth factor of the present invention to produce a maximum growth response in chicks over a four week test period. Stated in another way, one chick unit of the animal protein factor is equivalent to approximately 0.003 ml. of refined liver extract containing 10 USP injectable units per ml. Measured in this way the fermentation liquor will usually contain from about 5 to 10 chick units per ml. Improvements in the yield may be obtained by strain selection, modification of the growth medium, and selection of optimum conditions of fermentation.

Although the liquid medium, including the bacterial cells, may be added directly to the animal's diet by mixing with the mash or other components thereof, it is preferred that it be concentrated and dried, thereby making it easy to ship and mix with the animal's food in desired amounts at will. Such animal foods should contain from about 0.1 to 10 chick units per gram of feed. Isolation of the new substance from the cells and further purification of the liquor will result in a material which can be administered to human beings or other animals either orally or parenterally in the treatment of nutritional diseases. All of these various means of employing the new product are intended to be encompassed within the scope of the claims which follow:

I claim:

1. A process of producing a growth promoting factor which comprises the steps of inoculating a nutrient medium with the bacterial species *Flavobacterium solare,* allowing the bacteria to grow aerobically in the medium for a period of time of from about one to five days at a temperature within the range 20° C. to 40° C. and thereafter recovering the growth promoting factor resulting from the action of the bacteria.

2. A method of producing a growth promoting factor which comprises the steps of inoculating a liquid nutrient medium comprising a source of assimilable nitrogen, carbon, hydrogen and oxygen with the bacterial species *Flavobacterium solare* and after aerobic growth of the bacteria therein recovering the fermentation liquor and drying it.

3. The growth promoting factor formed by the action of a bacteria of the species *Flavobacterium solare* when grown aerobically on a nutrient medium in association with an edible carrier.

4. A method of producing an animal food which comprises inoculating a liquid growth medium with bacteria of the species *Flavobacterium solare* and after aerobic growth of the said bacteria therein for a period of from about one to five days at a temperature of from about 20° C. to 40° C. concentrating the said liquor and admixing therewith an animal food whereby the said animal food is enhanced with an essential growth factor.

5. The growth promoting substance produced by bacteria of the species *Flavobacterium solare* when grown with aeration in a liquid nutrient medium at a temperature of from about 28° C. to 32° C.

6. A method of correcting the vitamin deficiency of an all-vegetable diet which comprises the step of adding to an edible all-vegetable material a physiologically adequate amount of the chick growth factor produced by the action of bacteria of the species *Flavobacterium solare* when allowed to aerobically ferment a nutrient substrate.

MILTON A. PETTY.

REFERENCES CITED

The following references are of record in the file of this patent:

UNITED STATES PATENTS

| Number | Name | Date |
|---|---|---|
| 1,521,784 | Mitchell | Jan. 6, 1925 |
| 2,202,161 | Miner | May 28, 1940 |
| 2,297,671 | Yamasaki | Sept. 29, 1942 |

FOREIGN PATENTS

| Number | Country | Date |
|---|---|---|
| 488,704 | Great Britain | of 1938 |

OTHER REFERENCES

Bacterial Chemistry and Physiology by Porter 1946 p. 440.

Determinative Bacteriology by Berger 1930 p. 155.